United States Patent
Surma et al.

(10) Patent No.: US 6,737,604 B2
(45) Date of Patent: May 18, 2004

(54) SYMBIOTIC SOLID WASTE—GASEOUS WASTE CONVERSION SYSTEM FOR HIGH-EFFICIENCY ELECTRICITY PRODUCTION

(75) Inventors: Jeffrey E. Surma, Kennewick, WA (US); Daniel R. Cohn, Chestnut Hill, MA (US)

(73) Assignee: Integrated Environmental Technologies, LLC, Richland, WA (US)

( * ) Notice: Subject to any disclaimer, the term of this patent is extended or adjusted under 35 U.S.C. 154(b) by 290 days.

(21) Appl. No.: 09/932,858

(22) Filed: Aug. 17, 2001

(65) Prior Publication Data

US 2003/0042231 A1 Mar. 6, 2003

(51) Int. Cl.[7] .............................................. B23K 10/00
(52) U.S. Cl. ............................ 219/121.37; 219/121.48; 110/346
(58) Field of Search ...................... 219/121.37, 121.36, 219/121.44, 121.38, 121.43, 121.59; 110/346, 246, 250, 249, 242, 245; 373/9, 18–22, 77, 78; 588/900; 363/126; 75/10.41; 122/2

(56) References Cited

U.S. PATENT DOCUMENTS

| | | | | |
|---|---|---|---|---|
| 4,506,631 A | * | 3/1985 | Phong-Anant | 122/2 |
| 6,018,471 A | * | 1/2000 | Titus et al. | 363/126 |
| 6,380,507 B1 | * | 4/2002 | Childs | 219/121.37 |

* cited by examiner

*Primary Examiner*—Quang T. Van
(74) *Attorney, Agent, or Firm*—Choate, Hall & Stewart

(57) ABSTRACT

The system includes a source of solid, liquid or sludge waste and a source of waste gas. A waste conversion device receives the solid, liquid or sludge waste and converts it into a hydrogen-rich gas. An internal combustion engine receives as fuel the hydrogen-rich gas and the waste gas and burns them to produce mechanical work. A generator is operatively connected to the internal combustion engine to generate electricity. Some of the generated electricity may be used to power the waste conversion device. The system allows for high-efficiency, lean-burn operation while reducing the amount of waste converted to hydrogen-rich gas.

13 Claims, 3 Drawing Sheets

SYMBIOTIC SOLID WASTE— GASEOUS WASTE CONVERSION SYSTEM FOR HIGH-EFFICIENCY ELECTRICITY PRODUCTION

BACKGROUND OF THE INVENTION

This invention relates to waste conversion, and more particularly, to a system utilizing solid, liquid or sludge waste along with waste gas to generate electricity.

Industries such as the petrochemical industry generate substantial amounts of waste material that could be used for electricity generation, but is often not so utilized. Such waste typically includes solid, liquid or sludge waste, along with waste gas such as pentane. Oftentimes, the pentane is flared-off thereby wasting its energy content. Previous technologies have not been fully able to take advantage of the electricity generating capability of the wide-range of waste that is available. It is desirable to use both gaseous and non-gaseous waste to produce electricity, and to produce such electricity with the highest possible efficiency.

Previous technologies such as that disclosed in U.S. Pat. Nos. 5,847,353 and 6,066,825, the contents of which are incorporated herein by reference, disclosed the use of waste conversion apparatus to convert waste material into hydrogen-rich gas, which was then converted into electricity in a lean burn reciprocating engine producing electricity at high efficiency with low generation of nitrogen oxides. A significant amount of energy, however, is lost in the conversion of the waste into hydrogen-rich gas, thereby lowering overall efficiency. An objective of the present invention is to reduce the amount of waste that is converted into hydrogen-rich gas to increase efficiency.

SUMMARY OF THE INVENTION

The waste conversion system according to one aspect of the invention includes a source of solid, liquid or sludge waste along with a source of waste gas. A waste conversion device receives the solid, liquid or sludge waste and converts it into a hydrogen-rich gas. An internal combustion engine receives as fuel the hydrogen-rich gas and the waste gas. A generator is operatively connected to the internal combustion engine to generate electricity. In one embodiment, at least a portion of the waste gas is also converted into hydrogen-rich gas. In another embodiment, the system further includes a water shift reaction chamber for receiving the hydrogen-rich gas to convert it into additional hydrogen and carbon dioxide for subsequent delivery to the internal combustion engine.

In a preferred embodiment, the waste conversion device is a Plasma Enhanced Melter™ which may receive electricity from the generator for its operation. The system of the invention may be operated such that the ratio of energy contained in the hydrogen-rich gas to energy contained in the waste gas is in the range of 0.1–0.5. It is preferred that the internal combustion engine be operated at an equivalence ratio in the range of 0.3–0.7, and at a compression ratio in the range of 10–15. In a particularly preferred embodiment, the solid, liquid or sludge waste is K and F Waste and the waste gas is a pentane containing gas. The waste gas may also include syngas produced by the refinery process.

The present invention provides a more efficient approach to utilizing waste to generate energy because only a fraction of the waste is converted into the hydrogen-rich gas. Typically, only the solid, liquid or sludge is converted to hydrogen-rich gas; in some cases, a portion of the waste gas may also be converted into additional hydrogen-rich gas if necessary to assure stable lean burn operation. The addition of the hydrogen-rich gas to the waste gas enables lean operation of the internal combustion engine and increases the efficiency of electricity generation.

An important application of the technology disclosed herein is the extraction of energy from waste sludges and pentane containing gases produced by oil refineries as part of the refining process. The solid waste serves as the primary source of hydrogen-rich gas and this hydrogen-rich gas enables higher efficiency electricity generation using waste gas such as a pentane containing gas. The system of the invention therefore minimizes the amount of waste converted to hydrogen-rich gas.

DESCRIPTION OF THE PREFERRED EMBODIMENT

Figure 1:
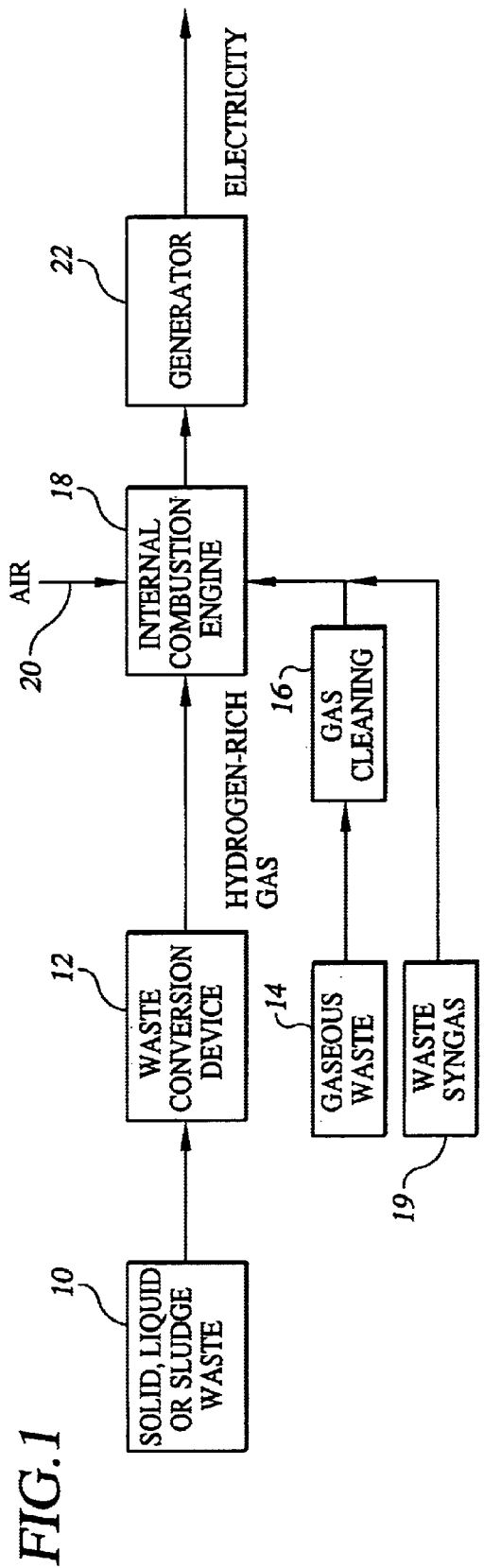
FIGS. 1–5 are block diagrams illustrating various aspects of the present invention.

With reference to FIG. 1, solid, liquid or sludge waste 10 is processed in a waste conversion device 12 to generate a hydrogen-rich gas ($H_2$+CO). Waste gas 14 passes through gas-cleaning apparatus 16, if necessary, and is delivered to an internal combustion engine 18 along with the hydrogen-rich gas from the waste conversion device 12. Waste syngas 19 may also be introduced into the engine 18. The internal combustion engine 18 burns the hydrogen-rich gas/waste gas with air 20. The internal combustion engine 18 is operatively connected to a generator 22 to generate electricity. The hydrogen in the hydrogen-rich gas permits operation of the internal combustion engine 18 in a lean mode to increase efficiency and reduce $NO_x$. It is preferred that the engine 18 operate at an equivalence ratio around 0.5. An equivalence ratio in the range of 0.3 to 0.7 is satisfactory. The equivalence ratio is defined as the actual fuel/air ratio divided by the stoichiometric ratio. Thus, an equivalence ratio less than one represents lean burn operation. A typical ratio of hydrogen-rich gas energy content to waste gas energy content is 0.2.

Figure 2:
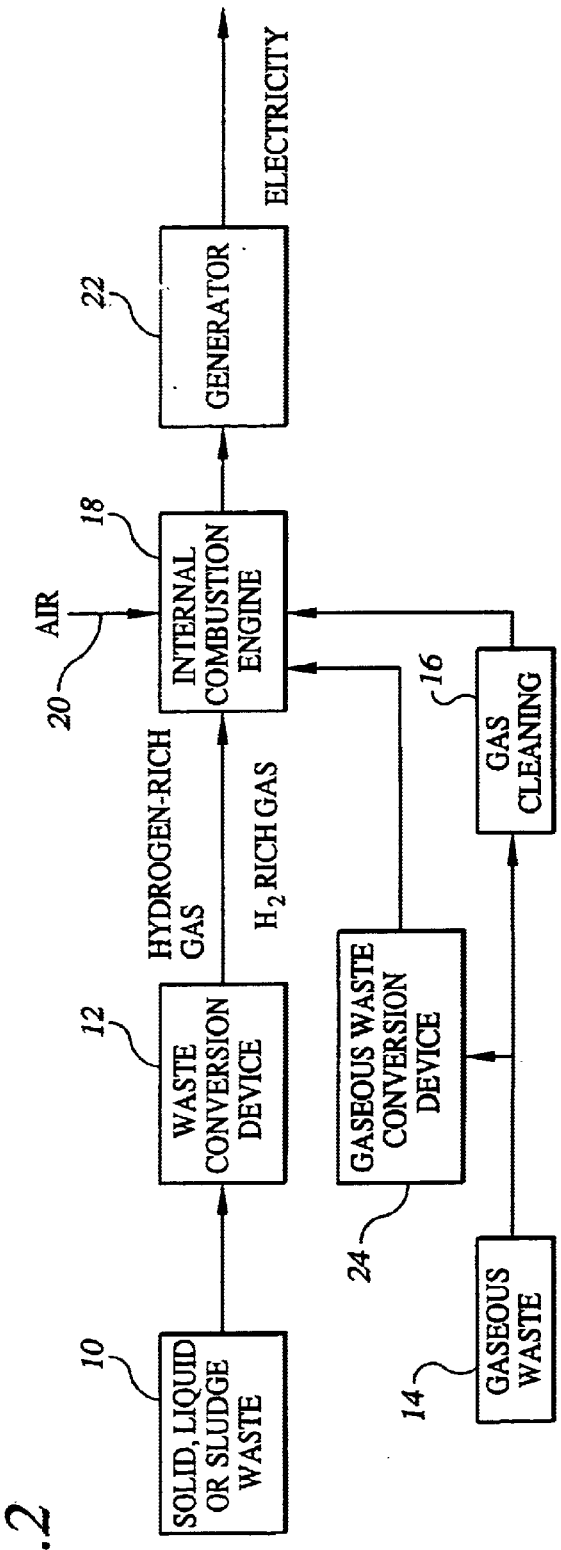

If additional hydrogen-rich gas (beyond that produced from the solid, liquid or sludge waste 10 in the waste conversion device 12) is required in order to produce an amount necessary to achieve stable lean operation of the engine 18 with the waste gas 14, some of the waste gas can be sent into the waste conversion device 12 or into a separate waste conversion device 24 as shown in FIG. 2. That is, the waste conversion devices 12 and 24 may be separate as shown in FIG. 2 or may simply be a single device. The amount of waste gas converted into hydrogen-rich gas should be minimized in order to maximize the overall efficiency of the system.

Figure 3:
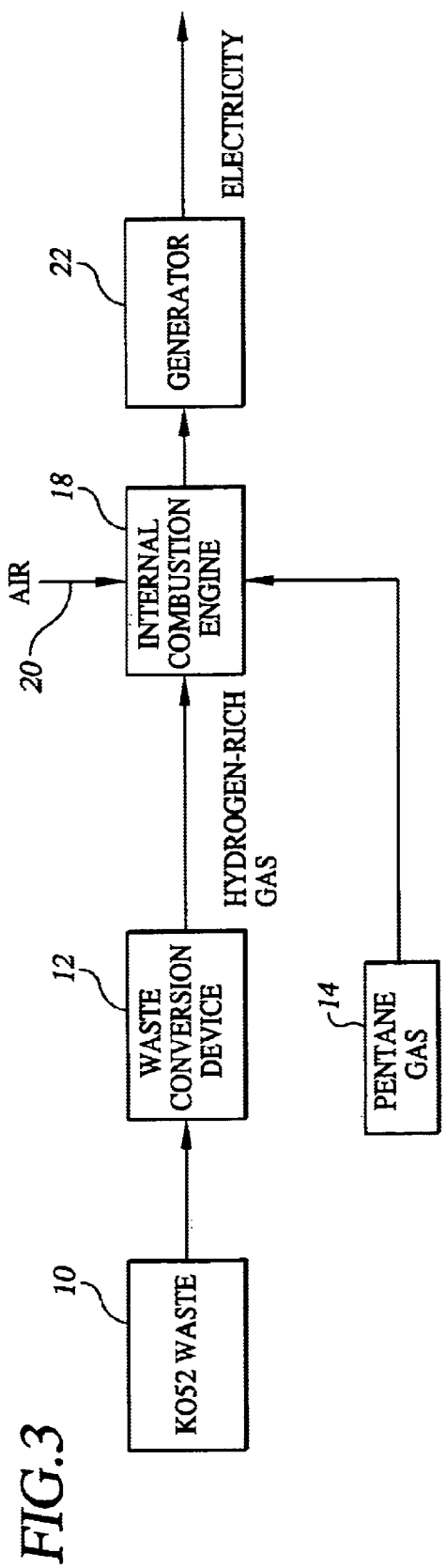
Figure 4:
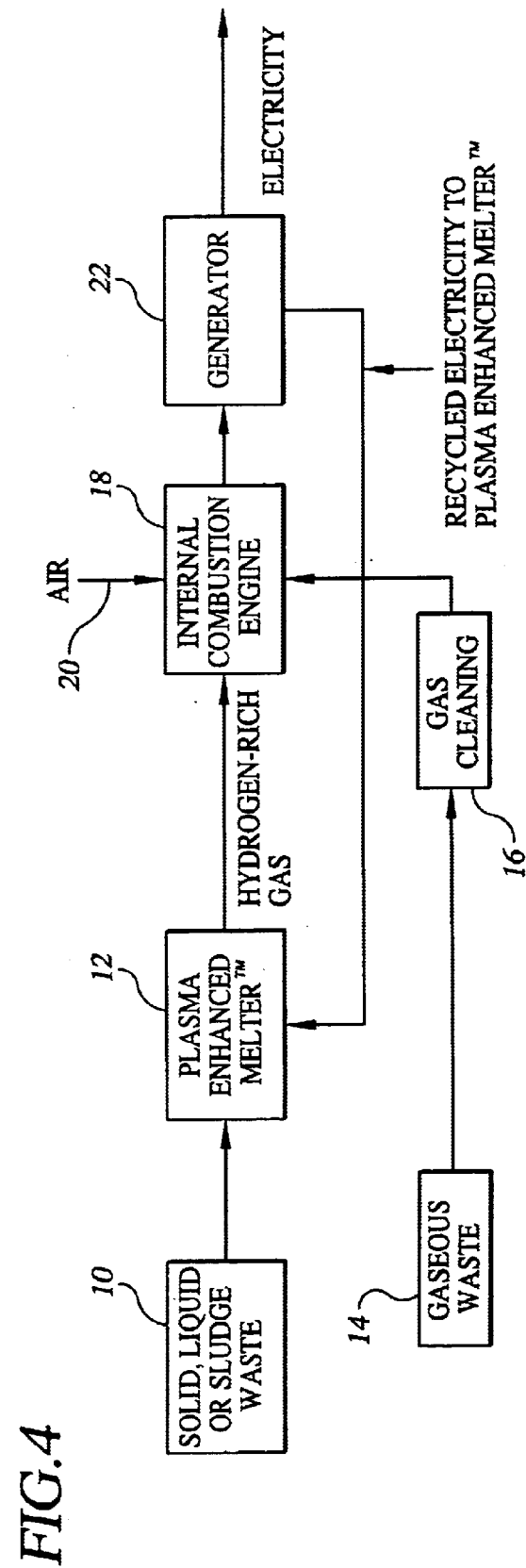

FIG. 3 illustrates an embodiment of the invention for use with waste produced in an oil refinery. Waste consisting primarily of oil and water known as K052 waste is processed in the waste conversion device 12 to generate hydrogen-rich gas. The waste gas 14 in this case contains pentane gas. As refineries switch to producing low-sulfur fuel, the use of pentane gas for electricity production becomes very attractive since the pentane gas does not have to be cleaned. FIG. 4 illustrates an embodiment of the invention in which the waste conversion device 12 is a Plasma-Enhanced Melter™ as disclosed in U.S. Pat. Nos. 5,798,497; 5,756,957 and 5,811,752, the contents of which are incorporated herein by reference. Some of the electricity generated by the generator 22 is used to power the Plasma-Enhanced Melter™.

A set of parameters for optimizing efficiency is shown in the Table below.

TABLE

| | |
|---|---|
| Hydrogen-rich gas energy / Waste gas energy | 0.1–0.2 |
| Equivalence ratio of internal combustion engine | 0.3 to 0.7 |
| Compression ratio of internal combustion engine | 10 to 15 |

Figure 5:
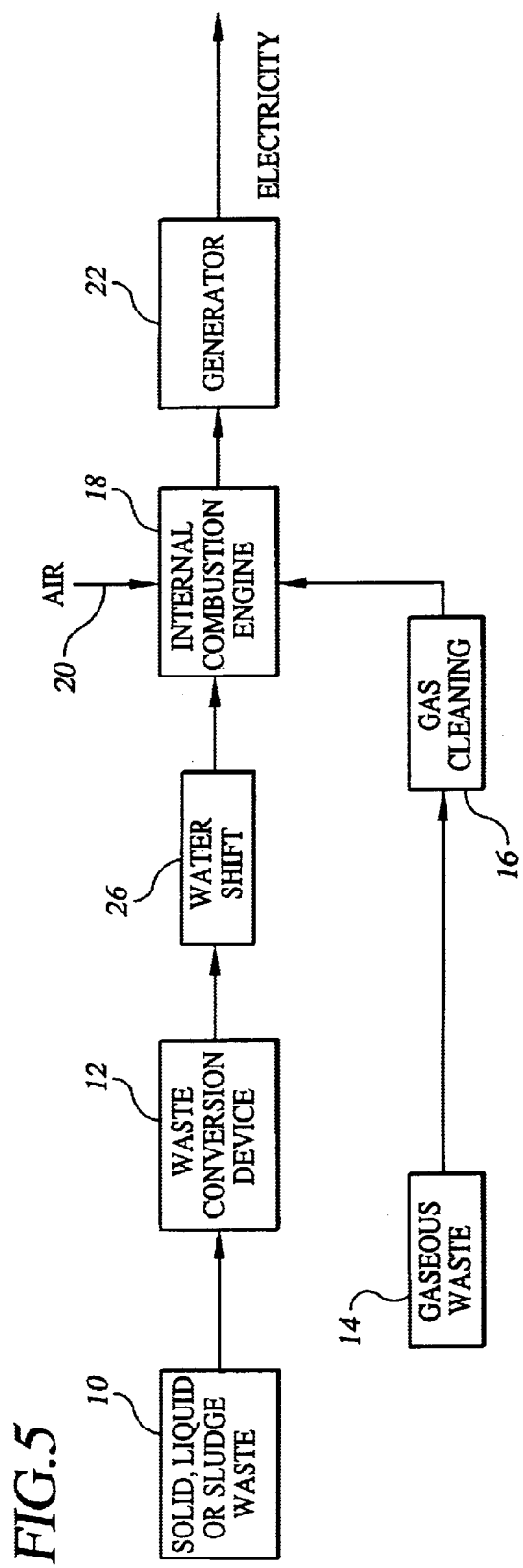

The amount of hydrogen in the hydrogen-rich gas produced from the solid waste can be increased by using a water shift reaction to convert the carbon monoxide (CO) in the hydrogen-rich gas into $H_2$ and carbon dioxide. In this way, more of the gaseous waste can be used in a high-efficiency, lean-burn engine. Such an embodiment is shown in FIG. 5 in which a water shift reaction device 26 is interposed between the waste conversion device 12 and the internal combustion engine 18. In a water shift reaction, hydrogen-rich gas is converted into hydrogen according to $(H_2+CO)+H_2O \rightarrow 2H_2+CO_2$. The additional hydrogen allows the use of more gaseous waste before the lean-burn limit is reached in the engine 18. This mode of operation is particularly important for solid waste that has a high carbon content such as a heavy oil and coke waste. For example, $C+2H_2O \rightarrow 2H_2+CO_2$. The water shift reaction chamber 26 may be positioned as shown in FIG. 5 or alternatively, steam reforming may be used in the waste conversion device 12 itself.

It is intended that all modifications and variations of the system disclosed herein be included within the scope of the appended claims.

What is claimed is:

1. Waste conversion system comprising:
    a source of solid, liquid or sludge waste;
    a source of waste gas;
    a waste conversion device for receiving the solid, liquid or sludge waste and converting the solid liquid or sludge waste into a hydrogen-rich gas;
    an internal combustion engine for receiving as fuel the hydrogen-rich gas and waste gas; and
    a generator operatively connected to the internal combustion engine to generate electricity.

2. The system of claim 1 wherein the waste conversion device is further adapted to receive at least a portion of the waste gas to convert said portion of the waste gas into hydrogen-rich gas.

3. The system of claim 1 further including water shift reaction chamber for receiving the hydrogen-rich gas to convert the hydrogen-rich gas into hydrogen and carbon dioxide for delivery to the engine.

4. The system of one of claims 1–3 wherein the waste conversion device is a plasma enhanced melter.

5. The system of claim 4 wherein the internal combustion engine is operated at an equivalence ratio in the range of 0.3–0.7.

6. The system of claim 5 wherein the internal combustion engine is operated at a compression ratio of in the range of 10–15.

7. The system of one of claims 1–3 wherein the ratio of energy contained in the hydrogen-rich gas to energy contained in the waste gas is in the range of 0.1–0.5.

8. The system of claim 7 wherein the internal combustion engine is operated at an equivalence ratio in the range of 0.3–0.7.

9. The system of claim 8 wherein the internal combustion engine is operated at a compression ratio of in the range of 10–15.

10. The system of one of claims 1–3 wherein the internal combustion engine is operated at an equivalence ratio in the range of 0.3–0.7.

11. The system of claim 10 wherein the internal combustion engine is operated at a compression ratio of in the range of 10–15.

12. The system of one of claims 1–3 wherein the solid, liquid or sludge waste is K waste and the waste gas is pentane containing gas.

13. The system of one of claims 1–3 wherein the waste gas in syngas.

* * * * *